US007418496B2

(12) United States Patent
Macey et al.

(10) Patent No.: US 7,418,496 B2
(45) Date of Patent: Aug. 26, 2008

(54) METHOD AND APPARATUS FOR SURVEY PROCESSING

(75) Inventors: William H. Macey, Arlington Heights, IL (US); Matthew W. Heck, Rolling Meadows, IL (US); Aaron Erickson, Oak Park, IL (US)

(73) Assignee: Personnel Research Associates, Inc., Rolling Meadows, IL (US)

( * ) Notice: Subject to any disclaimer, the term of this patent is extended or adjusted under 35 U.S.C. 154(b) by 550 days.

(21) Appl. No.: 10/844,067

(22) Filed: May 11, 2004

(65) Prior Publication Data

US 2004/0230989 A1 Nov. 18, 2004

Related U.S. Application Data

(60) Provisional application No. 60/471,223, filed on May 16, 2003.

(51) Int. Cl.
*G06F 15/173* (2006.01)
(52) U.S. Cl. .............. 709/224; 709/203; 709/229; 705/10; 725/24
(58) Field of Classification Search ............ 709/203, 709/223, 229, 224; 705/10; 725/9, 24
See application file for complete search history.

(56) References Cited

U.S. PATENT DOCUMENTS

| 5,473,607 | A * | 12/1995 | Hausman et al. ............ 370/392 |
| 6,134,532 | A * | 10/2000 | Lazarus et al. |
| 6,189,029 | B1 * | 2/2001 | Fuerst ........................ 709/217 |
| 6,311,190 | B1 * | 10/2001 | Bayer et al. |
| 6,574,621 | B1 * | 6/2003 | Lautzenheiser et al. ........ 707/4 |
| 6,728,693 | B1 | 4/2004 | Lautzenheiser et al. |
| 6,889,230 | B1 * | 5/2005 | Rogers ..................... 707/104.1 |
| 6,912,521 | B2 * | 6/2005 | Kraft et al. ..................... 707/2 |
| 7,054,827 | B1 * | 5/2006 | Lautzenheiser et al. ....... 705/10 |
| 7,233,908 | B1 * | 6/2007 | Nelson |
| 2001/0032115 | A1 * | 10/2001 | Goldstein |
| 2002/0002482 | A1 * | 1/2002 | Thomas ...................... 705/10 |
| 2002/0007303 | A1 * | 1/2002 | Brookler et al. |
| 2002/0065709 | A1 * | 5/2002 | MacKenzie ................. 705/10 |
| 2002/0069207 | A1 * | 6/2002 | Alexander et al. |
| 2002/0095431 | A1 * | 7/2002 | McGeorge et al. |
| 2002/0128898 | A1 * | 9/2002 | Smith et al. .................. 705/10 |
| 2002/0143901 | A1 * | 10/2002 | Lupo et al. |
| 2002/0156673 | A1 * | 10/2002 | Barker ........................ 705/10 |

(Continued)

FOREIGN PATENT DOCUMENTS

KR 2002002193 A * 1/2002

*Primary Examiner*—Oanh Duong
(74) *Attorney, Agent, or Firm*—McAndrews, Held & Malloy, Ltd.

(57) ABSTRACT

Certain embodiments of the present invention provide a system and method for improved, real-time survey data processing and analysis. Certain embodiments use distributed computing techniques to perform statistical calculations for survey data, such as general purpose and multi-rater feedback data. Certain embodiments use a matrix structure coupled with hash tables for efficient processing of survey statistics across an entire survey. Certain embodiments use a criteria parser based on externally definable lexical rules to determine which survey responses belong to which groups. Certain embodiments allow coalescing of summarization requests between summarization servers to allow for peak performance across any number of surveys. Certain embodiments provide a scalable, adaptable survey processing system and method that processes survey results in real time, allowing for immediate feedback during the survey process.

17 Claims, 8 Drawing Sheets

U.S. PATENT DOCUMENTS

| | | | |
|---|---|---|---|
| 2003/0009372 A1* | 1/2003 | Nyhan et al. | 705/10 |
| 2003/0074272 A1* | 4/2003 | Knegendorf et al. | 705/26 |
| 2003/0105659 A1* | 6/2003 | Eisenstein | 705/10 |
| 2003/0105814 A1* | 6/2003 | Kamiya et al. | 709/203 |
| 2003/0140150 A1* | 7/2003 | Kemp et al. | 709/229 |
| 2003/0182135 A1* | 9/2003 | Sone | 705/1 |
| 2003/0200137 A1* | 10/2003 | Drummond | |
| 2003/0204436 A1* | 10/2003 | Flender et al. | 705/10 |
| 2003/0204437 A1* | 10/2003 | Flender et al. | 705/10 |
| 2003/0208370 A1* | 11/2003 | Wilson et al. | |
| 2003/0220831 A1* | 11/2003 | Son | 705/10 |
| 2004/0049416 A1* | 3/2004 | Alison et al. | 705/10 |
| 2004/0059624 A1* | 3/2004 | Wantulok et al. | 705/10 |
| 2004/0093261 A1* | 5/2004 | Jain et al. | 705/10 |
| 2004/0128183 A1* | 7/2004 | Challey et al. | |
| 2005/0075919 A1* | 4/2005 | Kim | 705/10 |
| 2006/0111959 A1 | 5/2006 | Tarr et al. | |

* cited by examiner

100

200

400

410 → Receive new message notification.

420 → Determine a survey to process.

430 → Examine entries in queue.

440 → Remove entries belonging to selected survey.

450 → Group the events and pass to summarization engine.

600

700

800

810 → Compile list of survey participants.

820 → Distribute survey to participants.

830 → Connect to survey system.

840 → Capture survey responses.

850 → Remove identifying information from response.

860 → Process survey responses.

870 → Generate report.

METHOD AND APPARATUS FOR SURVEY PROCESSING

RELATED APPLICATIONS

The present application relates to, and claims priority from, U.S. Provisional Application No. 60/471,223 filed on May 16, 2003, and entitled "Method and Apparatus for Survey Processing".

BACKGROUND OF THE INVENTION

The present invention generally relates to survey data processing and analysis. More specifically, the present invention relates to improved, real-time survey data processing and analysis.

Many companies value surveys, such as employee evaluation and satisfaction surveys. Companies use employee surveys to judge performance and award promotions, for example. Companies also use customer satisfaction surveys to gauge success of products or services and determine improvements. Managers may also be evaluated by employees using surveys.

Surveys may help initiate changes in a workplace environment, product or service improvements, and employee training, for example. Survey results may influence major strategic decisions by a corporation. Current survey systems do not provide a rapid response to help in making important, timely business decisions. Additionally, current survey systems are not easily accessible on demand.

Therefore, a system that provides real-time administration and processing of a survey would be highly desirable. Additionally, a system that improves accessibility to surveys, survey data, and survey statistics would be highly desirable. A survey processing system that allows survey information and classifications to be dynamically adjusted would also be highly desirable. Thus, there is a need for a system and method for improved, real-time survey data processing and analysis.

BRIEF SUMMARY OF THE INVENTION

Certain embodiments of the present invention provide a system and method for improved, real-time survey data processing and analysis. Certain embodiments use distributed computing techniques to perform statistical calculations for survey data, such as general purpose and multi-rater feedback data. Certain embodiments use a matrix structure coupled with hash tables for efficient processing of survey statistics across an entire survey. Certain embodiments use a criteria parser based on externally definable lexical rules to determine which survey responses belong to which groups. Certain embodiments allow multiplexing of summarization requests between summarization servers to allow for peak performance across any number of surveys. Certain embodiments provide a scalable, adaptable survey processing system and method that processes survey results in real time, allowing for immediate feedback during the survey process.

In an embodiment, a survey processing system includes a read engine adapter for reading survey data and marking a starting point for processing of survey data, a statistical survey processor for processing the survey data using lexical analysis, the statistical survey processor generating statistics for at least one of a survey, a question, and a dimension based on the survey data, and a write engine adapter for outputting updated survey statistics.

The read engine may read a previous summarization state from a database to establish an initial state for summarization and statistical processing. In an embodiment, the statistical survey processor includes a criteria parser for categorizing survey data based upon definable lexical rules. The statistical survey processor may identify reporting groups of which the survey data is a member. The system may also include a hash matrix for storing statistics for a survey.

In an embodiment, a real-time survey analysis system includes a runtime engine for receiving survey data, at least one summarization coalescer for sorting survey data and routing the survey data to at least one statistical summarization engine, and at least one statistical summarization engine for analyzing the survey data in real time to perform at least one of summarization and statistical analysis. The at least one summarization coalescer sorts and routes the survey data based on at least one criterion.

In an embodiment, the at least one summarization coalescer receives a stream of survey data from a plurality of sources. The survey data may include survey completion data and/or new survey reporting group data. The one or more criterion may include one or more criterion to allow the summarization coalescer to group incoming survey data in an optimal order for processing. In an embodiment, the summarization coalescer compares a plurality of survey data with a history list of recently processed surveys to route the plurality of survey data to the at least one statistical summarization engine. The one or more statistical summarization engines may read a previous summarization state from a database to mark a starting point from incremental statistic computation using the survey data.

In an embodiment, the real-time survey analysis system further includes a reporting engine for generating a new group for survey reporting. The system may also include a database for storing at least one of survey data and survey reporting group definitions. Additionally, the system may include a user interface for entering survey data. In an embodiment the user interface is a Web-based user interface.

An embodiment of a method for real-time processing of survey data includes receiving a survey event, determining a routing of the survey event based on at least one criterion, routing the survey event to a survey processor, processing the survey event at the survey processor in real time, and providing real-time feedback from the survey event. The method may further include determining whether an incoming event includes survey data or a new survey group. In an embodiment, the processing step includes statistical processing of survey data. The processing step may also include creating a new survey group. In an embodiment, the processing step analyzes survey responses by survey, question, and/or theme. The method may also include updating stored data based on the processed survey event.

Figure 1:
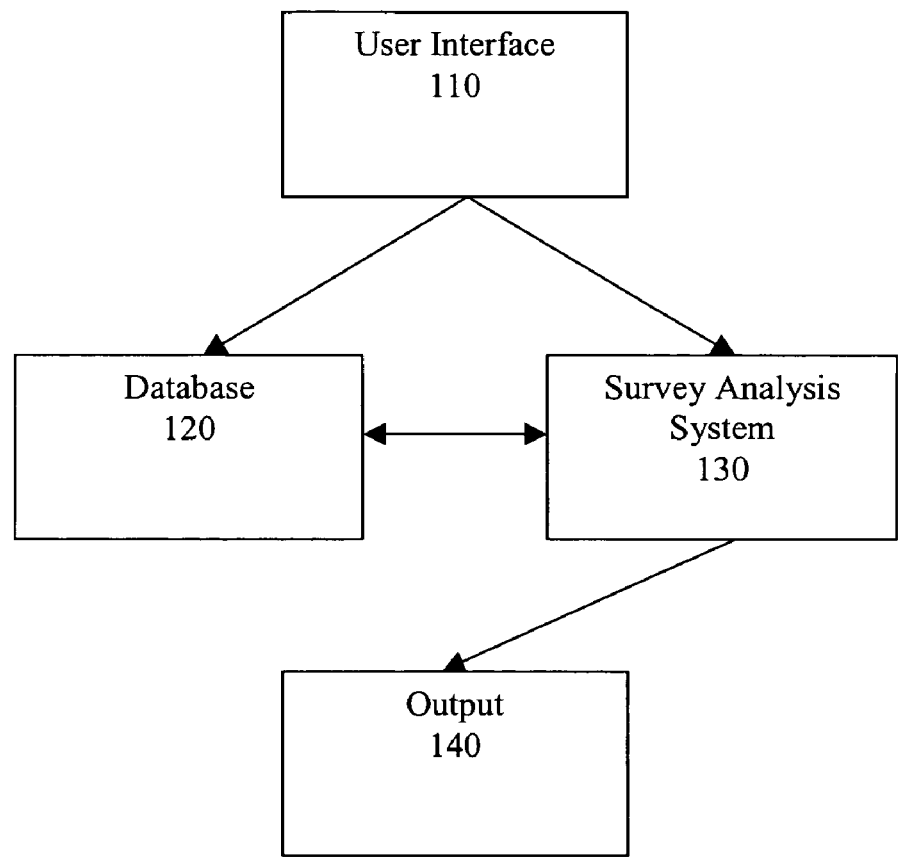
FIG. 1 illustrates a survey system used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a survey system 100 used in accordance with an embodiment of the present invention. The system 100 includes a user interface 110, a database 120, a survey analysis system 130, and an output 140.

The user interface 110 presents a user with a survey and accepts the user's survey data. The survey data is then transmitted to the database 120 for storage. The survey analysis system 130 processes the data from the database 120 to produce desired output. Processed results may be displayed at the output 140 and/or stored in the database 120.

In an embodiment, the user interface 110 may be a Web-based interface or other data input form, for example. The user interface 110 may be implemented with Hypertext Markup Language (HTML), Extensible Markup Language (XML), Simple Object Access Protocol (SOAP), perl, java, or other Common Gateway Interface (CGI) scripts, for example, to capture user survey responses as data for the database 120. Data and other messages may be passed from the user interface 110 to the database 120 using a message transport, such as Microsoft® Message Queue. In an embodiment, the database 120 is a server such as a cluster of quad processor servers running Structured Query Language (SQL) Server and configured to provide redundancy and security for data. The user interface 110 may reside on the same computer as the database 120 or the survey analysis system 130 or may be implemented on a separate computer. For example, the user interface 110 may be run on a single or dual processor server. The components of the system 100 may be networked via a connection such as Ethernet, gigabit Ethernet, wireless connection, or other wire connection. In an embodiment, TCP/IP is used as a network protocol for communication between system 100 components. In an embodiment, the survey analysis system 130 is a quad processor server, for example. The components of the system 100 may be implemented in software and/or in hardware.

Figure 2:
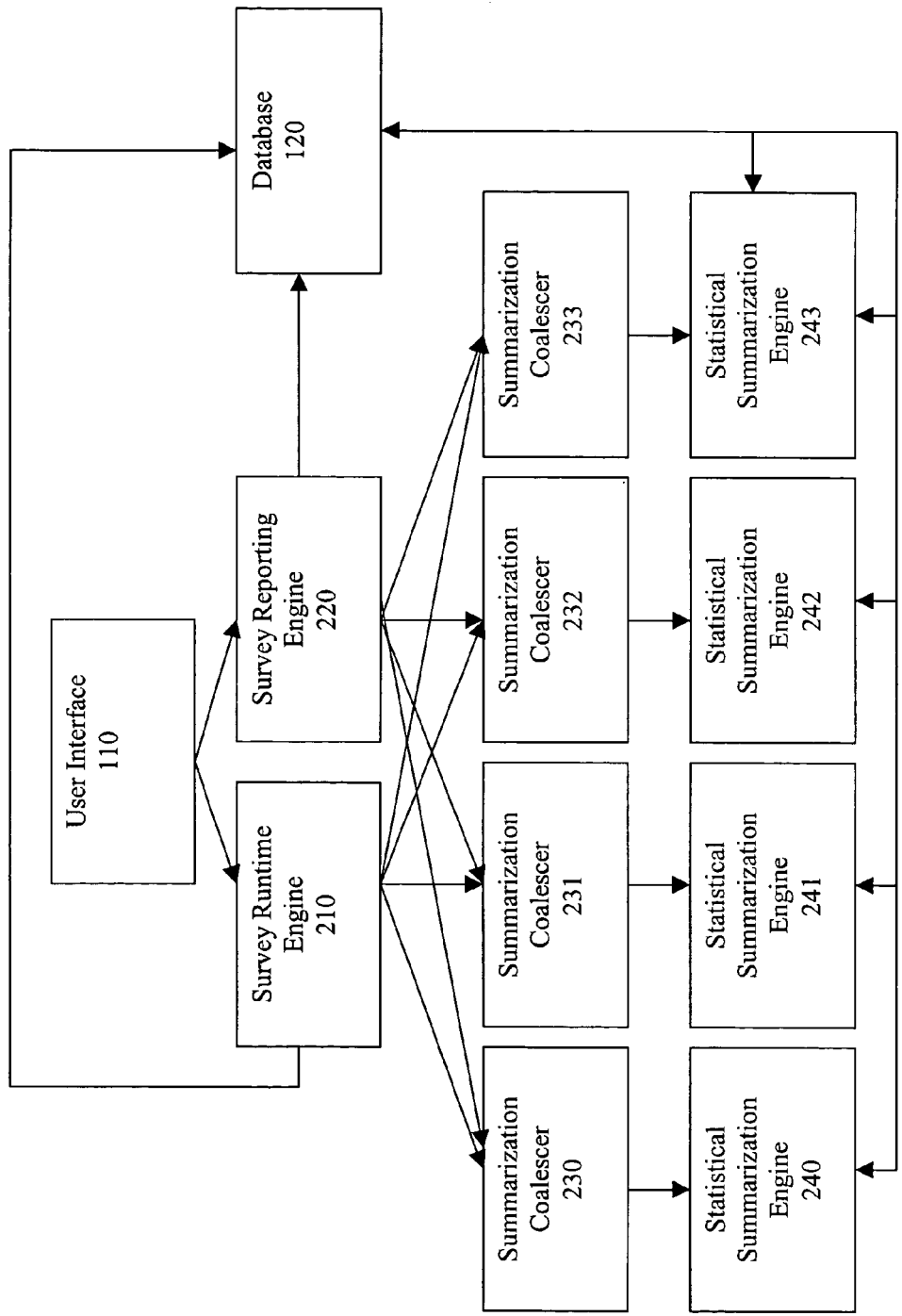
FIG. 2 shows a survey analysis system used in accordance with an embodiment of the present invention.

FIG. 2 shows a survey analysis system 200 used in accordance with an embodiment of the present invention. The survey analysis system 200 is similar to the surface analysis system 130 described above in relation to FIG. 1. The analysis system 200 includes a survey runtime engine 210, a survey reporting engine 220, summarization coalescers 230-233, and statistical summarization engines 240-243.

The survey runtime engine 210 receives survey data from the user interface 110. Survey data is transmitted to the database 120. The survey runtime engine 210 also sends a survey complete message to one of the summarization coalescers 230-233. Similarly, the survey reporting engine 220 may send a group definition to the database 120 and a group definition complete message to one of the summarization coalescers 230-233. The summarization coalescers 230-233 communicate with statistical summarization engines 240-243 to summarize and perform a statistical analysis, for example, of the survey data or group definition. The statistical summarization engines 240-243 receive information from the database 120 and update the database 120.

In an embodiment, after a user has completed a survey at the user interface 110, such as a Web-based survey, a survey complete event is generated by the survey runtime engine 210. The event includes information that identifies the survey response record in the form of a database identifier, a survey identifier, and user respondent identifier combination, for example. The survey complete event may be sent to a statistical summarization engine 240-243 directly or to a summarization coalescer 230-233 for routing to an appropriate statistical summarization engine 240-243. The survey complete event may also be marked in the database 120 as an uncompleted request for summarization for the user.

Similarly, in another embodiment, a user may create a new group for reporting. The survey reporting engine 220 generates a new group event including an identifier for the group. The new group event may be sent to a statistical summarization engine 240-243 directly or to a summarization coalescer 230-233 for routing to an appropriate statistical summarization engine 240-243. The survey reporting engine 220 may also send the new group definition to the database 120 for use in creating a new summarization record for the group, for example.

The summarization coalescer 230-233 receives a stream of events from multiple sources. The stream of events includes a new group definition event and/or a new survey complete event, for example. The summarization coalescer 230-233 groups incoming messages, such as grouping messages in an optimal order, to facilitate efficient summarization. Messages are sent to statistical summarization engines 240-243 based on to which survey the respondent is responding (for survey complete events) or the group being defined (for new group definition events).

Figure 3:
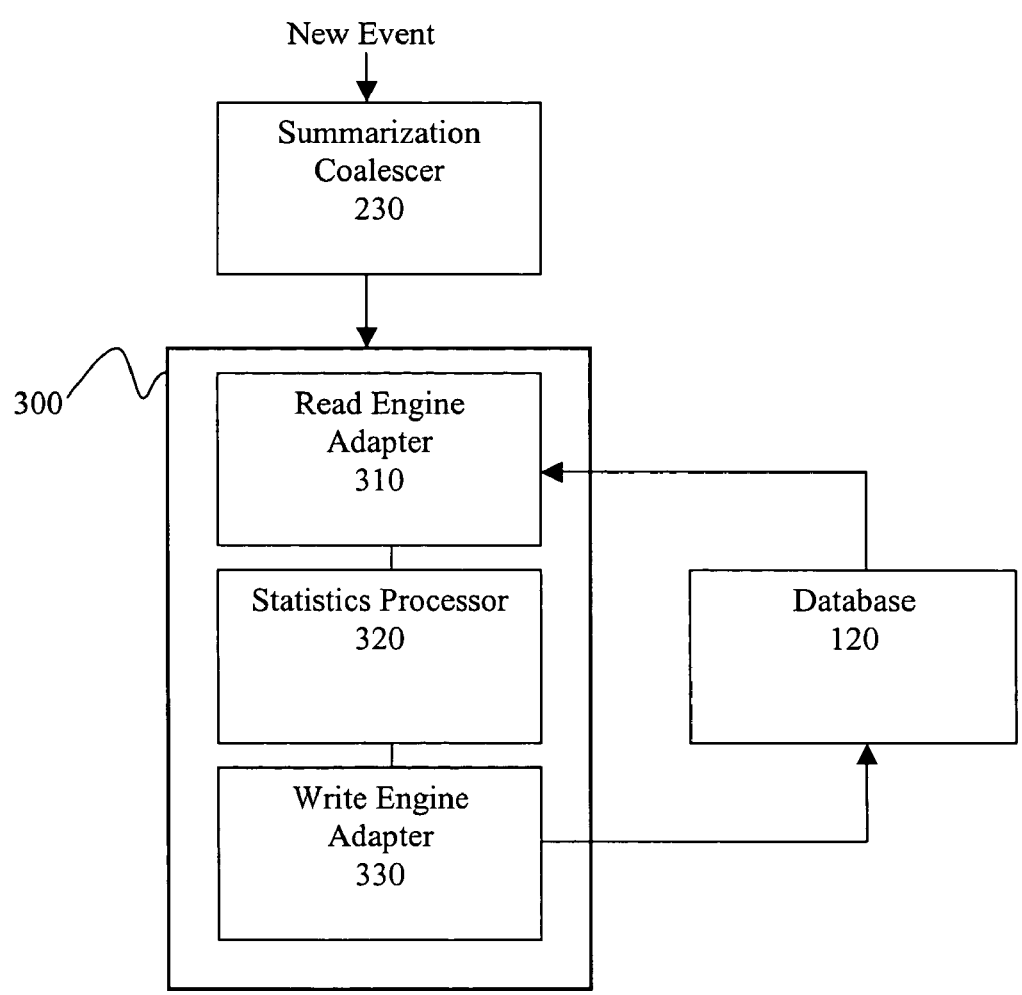
FIG. 3 illustrates a statistical summarization engine used in accordance with an embodiment of the present invention.

FIG. 3 illustrates a statistical summarization engine 300 used in accordance with an embodiment of the present invention. The statistical summarization engine 300 is similar to the statistical summarization engines 240-243 described above in relation to FIG. 2. The statistical summarization engine 300 includes an engine adapter (read) 310, a statistics processor 320, and an engine adapter (write) 330. The components of the summarization engine 300 are described in further detail below.

The summarization coalescer 230 receives a new event. The summarization coalescer 230 sorts incoming messages in a queue. The summarization coalescer 230 may also group incoming event messages in an optimal order to facilitate efficient summarization. In an embodiment, the summarization coalescer 230 has optimization goals including grouping summarization messages in the largest possible groups based on current queue status and assuring that each survey is given "attention". For example, even if survey A has 1000 times more survey submit events than survey B, survey B will not have to wait an overly long amount of time to be analyzed and updated. In an embodiment, the summarization coalescer 230 runs until no more messages are present in the message queue. When the queue is empty, the summarization coalescer 230 "sleeps" until a new message is received. The summarization coalescer 230 may run perpetually if the queue is never empty.

Figure 4:
FIG. 4 shows a flow diagram for a method for sorting event messages in the statistical summarization engine used in accordance with an embodiment of the present invention.
Figure 4:
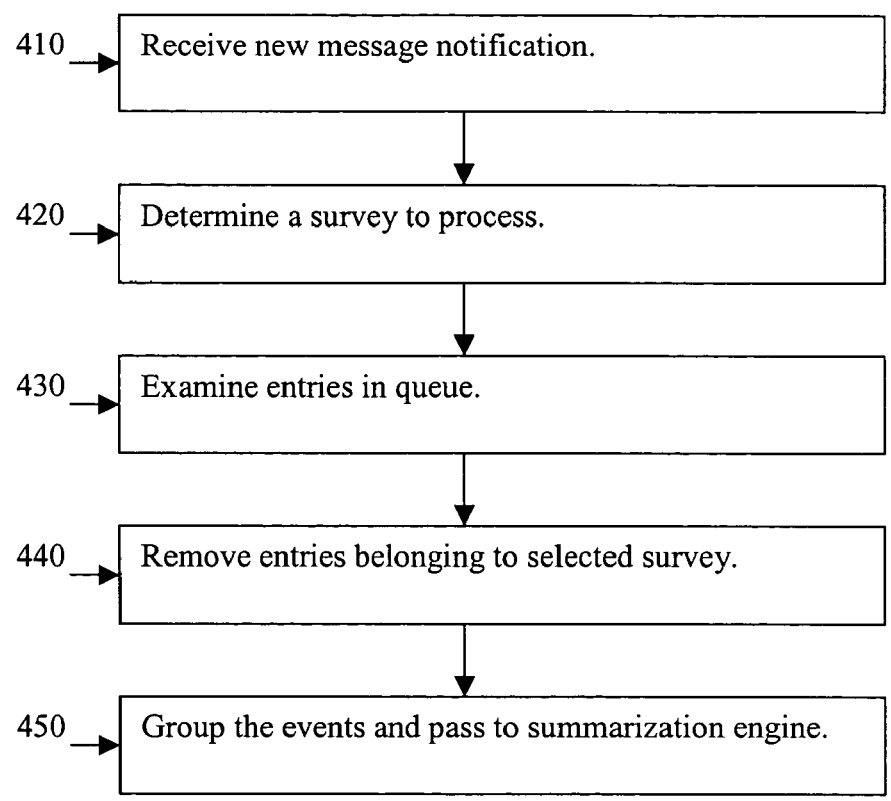

FIG. 4 shows a flow diagram 400 for a method for sorting or coalescing event messages in the summarization coalescer 230 used in accordance with an embodiment of the present invention. In an embodiment, the summarization coalescer 230 processes as many events that belong to a survey as possible. First, at step 410, a new message notification is received at the summarization coalescer 230 from the messaging system, such as Microsoft® Message Queue. Next, at step 420, the summarization coalescer 230 determines a survey to process. Then, at step 430, the summarization coalescer 230 examines entries in the queue (up to a limit of "t" elements, for example). At step 440, entries belonging to the survey that has been selected for processing are removed from the queue. Next, at step 450, data from the events are grouped and passed to the summarization engine 300.

As described above, the summarization coalescer 230 determines which survey to process. In an embodiment, the summarization coalescer 230 retains a history list of surveys recently processed. To determine which survey to process, the summarization coalescer 230 compiles a candidate list of possible combinations by finding all unique surveys that are represented in the queue up to a certain depth "d". Once the candidate list "C" is developed, the candidate list is compared to the history list. The history list "H" represents surveys that have been recently processed, up to depth "h". Entries in the history list may be listed in order of completion with the most recently completed surveys at the top, for example.

In an embodiment, the summarization coalescer 230 tries to find the first entry in "C" that is not in "H" (C/H), while at the same time computing an ordered set "HC" that represents the intersection of "H" and "C" (H∩C). If (C/H) evaluates to a non-empty set, the first item from (C/H) is selected as the summarization candidate. If (C/H) evaluates to an empty set, the candidate is chosen from the last element in the set (H∩C) as represented by "HC". If the set is non-empty, the first candidate is taken from a list of candidates that has not been processed recently. If the set is empty, all of the candidates have been processed recently. Thus, the candidate that represents the least recently processed survey (last element from (H∩C)) is processed. Once the list of messages is determined, the list is compiled into a set of "M" that may be represented internally by a vector structure. The vector is then passed to the summarization engine 300 for processing.

As described above, "t" represents a number of entries to "peek" up the queue when computing the set of "M" messages to be processed in a single iteration of the statistical summarization engine 300. In an embodiment, "t" is set according to the available RAM on a computer running the statistical summarization engine 300. For example, a server with 2 GB of RAM may process approximately 100,000 survey complete events from a single survey.

The candidate seek depth "d" represents a number of entries to "peek" up the queue when computing the set "C" of candidate surveys to be processed. The depth "d" helps to ensure that the summarization coalescer 230 does not spend too much time gathering candidates in cases where survey processing in an instance of the summarization coalescer 230 is predominantly a small number of surveys.

A candidate set limit "c" indicates a maximum number of candidate events to gather. For example, if a candidate gathering operation yields "c" entries before getting to depth "d" in the queue, the candidate gathering operation loop stops. The limit "c" helps to optimize time spent gathering candidates when a high number of different surveys are being processed at any one time.

The history set limit "h" indicates a maximum number of candidate history entries to remember. A low setting for "h" may result in "resource starvation" for small surveys that are being summarized on the same server as large surveys. A high setting for "h" may result in overly long computation time for finding the candidate.

As described above, in an embodiment, the summarization coalescer 230 processes entries in the queue so that requests are grouped in a manner that does not starve surveys from getting summarization requests processed in favor of a dominant survey at a particular time. Avoiding resource starvation versus performance of the coalescing operation may then be controlled by variables that control the depth and memory of the candidate seeking. In an alternative embodiment, the summarization coalescer 230 may simply examine the first item in the queue and then grab the first "z" items that match the first item. Resource starvation would be avoided, but a dominant survey may be able to affect the summarization of a lesser quantity survey. For example, many requests coming from one survey may cause a backup that affect the summarization speed of a much smaller survey. However, the simpler method may provide less overhead and complexity in configuration.

The summarization engine 300 receives summarization requests as compiled by the summarization coalescer 230 and drives a summarization computation based on the requests. The engine adapter (read) 310 reads survey data from the database 120 according to the messages from the summarization coalescer 230. The engine adapter (read) 310 reads a previous summarization state from the database 120 to mark a starting point for incremental statistic computation.

Figure 5:
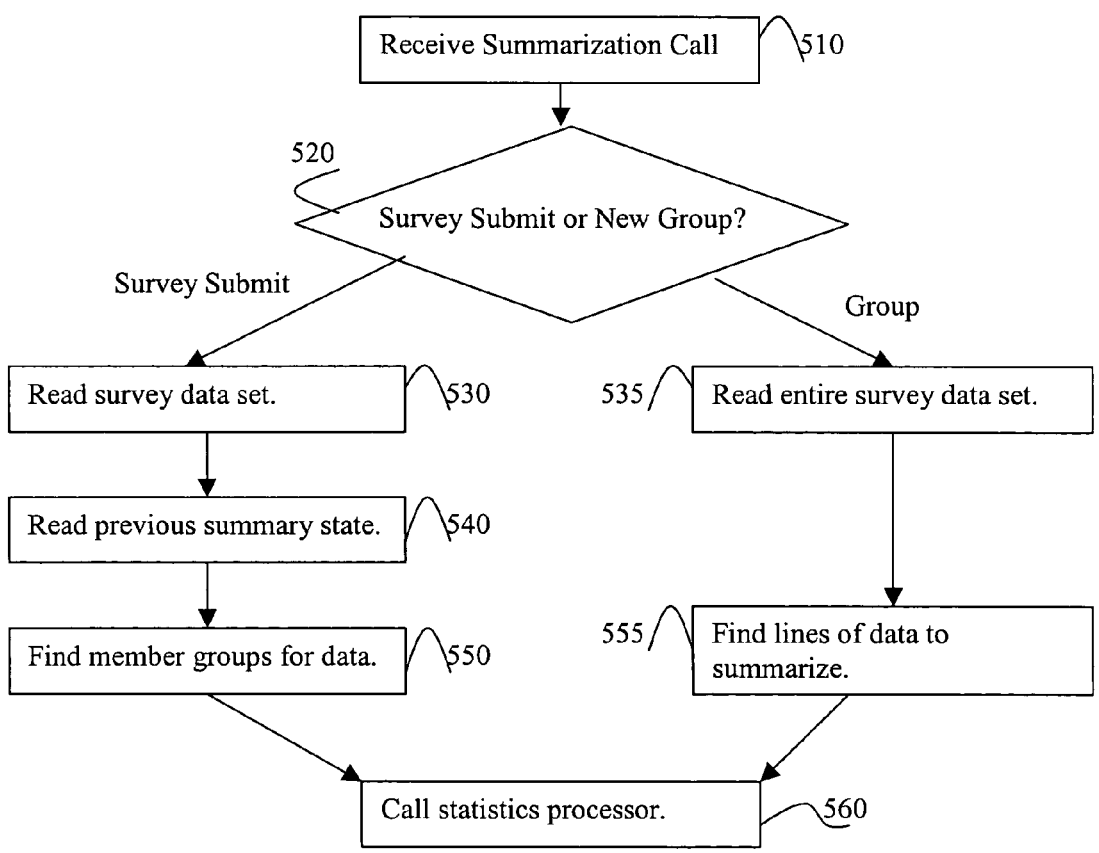
FIG. 5 illustrates a flow diagram for a method of reading summarization requests in preparation for summarization used in accordance with an embodiment of the present invention.

FIG. 5 illustrates a flow diagram 500 for a method of reading summarization requests in preparation for summarization used in accordance with an embodiment of the present invention. First, at step 510, the engine adapter (read) 310 receives a summarization call from the summarization coalescer 230. Then, at step 520, the engine adapter (read) 310 determines if the message relates to a survey submit event or a new group event.

If the summarization request message relates to a survey submit event, then at step 530, the engine adapter (read) 310 reads a survey data set from the database 120 for the new survey responses. The survey data set includes structural information about the survey (groups of related questions or items, master dimension or theme composed of subcomponents, for example). If the summarization request message relates to a new group event, then at step 535, the engine adapter (read) 310 reads an entire survey data set from the database 120. The data set may include items, dimensions, response scales, and other related information, for example.

Next, for a survey submit event, at step 540, a previous summary state is read from the database 120. The previous summary state may include item, dimension, response scale, and other related information, for example. The previous summary state represents an initial state before incremental summarization.

Then, for a survey submit event, at step 550, groups are found for each line of data of which, based on the data, for example, the respondent is a member. The statistics processor 320 may be called to determine to which groups each single line of data belongs. Group membership for a survey may be based on answers from the survey or pre-coded information that is attached to the respondent, such as division or demographic information, for example. For a new group event, at step 555, lines of data are found that the new group will summarize. The statistics processor 320 may be called to determine which lines of data belong to the new group. The group may be initially calculated based on surveys that have been submitted prior to creation of the group. In an embodiment, group and survey submit events are run serially so that incorrect data is not created by a survey event being processed at the same time as a group to which it belongs. Order of operations is not important.

At step 560, the engine adapter (read) 310 calls the statistics processor 320 to perform a calculation for the affected groups (for the new group if the event is a new group event). Structure, information, data to be summarized, and groups to which the data applies may be passed to the statistics processor 320, for example.

In an embodiment, the statistics processor 320 updates statistics based on new survey responses or creates new statistics lines based on new groups. The statistics processor 320 performs incremental statistical computation to determine an adjusted state of statistics based on newly received survey data (e.g., incremental summarization), for example. The statistics processor 320 also performs parsing of data to determine group membership for a given respondent. Parsing by groups allows the read engine adapter 310 to load groups into the statistical summarization engine 300 that may be applicable for a particular round of incremental summarization.

In an embodiment, the statistics processor 320 includes a criteria parser. The criteria parser uses declarative logic statements to perform a lexical analysis of a survey data stream, for example. The criteria parser performs a lexical analysis of the data stream to determine which data belongs to which group, for example. The parser may be customized to implement operators allowing faster and more efficient parsing of survey data. For example, a parser with specialized operators may be generated using Unix utilities lex and yacc and programmed using the C or C++ programming language.

Figure 6:
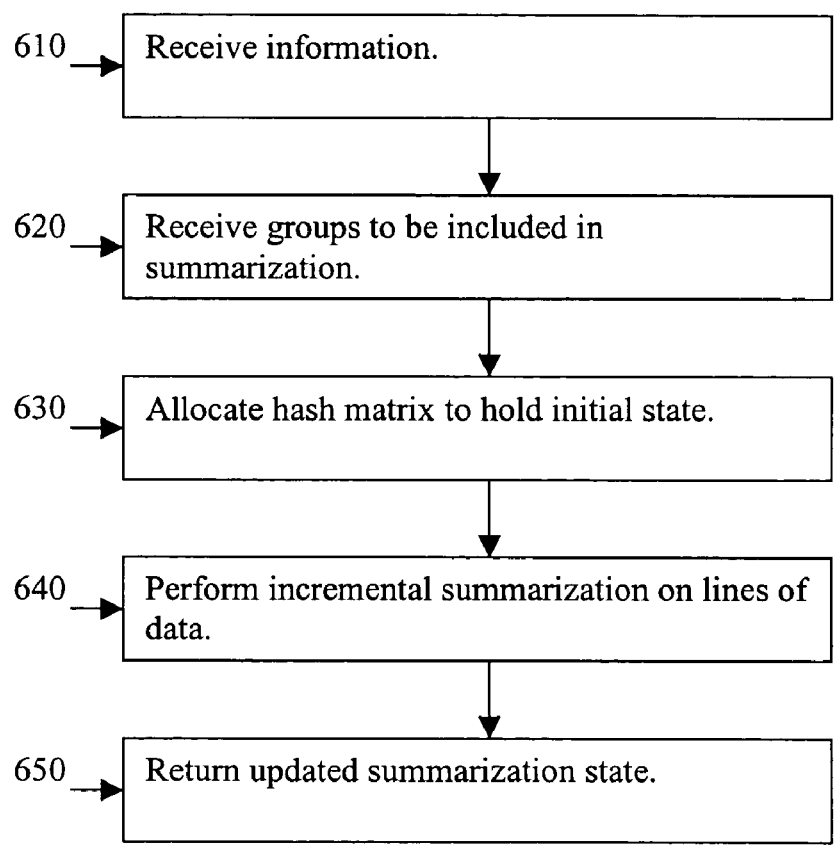
FIG. 6 illustrates a flow diagram for a method for statistical summarization used in accordance with an embodiment of the present invention.

FIG. 6 illustrates a flow diagram 600 for a method for statistical summarization used in accordance with an embodiment of the present invention. First, at step 610, the statistics processor 320 receives a structure of items, themes or dimensions, response scales, recode buckets, and other related information, for example. Then, at step 620, the statistics processor 320 receives groups to be included in summarization. Next, at step 630, the statistics processor 320 allocates a hash matrix data structure to hold an initial state for the data.

At step 640, the statistics processor 320 receives each relevant line of data and performs incremental summarization. That is, the statistics processor 320 increments the appropriate line in the data set. For each line of data, the statistics processor 320 uses the previous state and the new line of data for each group of which the line is a member. The statistics processor 320 updates the hash matrix with the updated data. Then, at step 650, once all lines of data are processed, the updated summarization state is returned to the engine adapter (write) 330.

The hash matrix structure used in summarization stores statistics for a survey in a memory efficient manner. The hash matrix structure includes hash tables on each axis of the matrix. In an embodiment, the hash matrix provides a constant look-up time with minimal collisions.

In an embodiment, the hash matrix stores statistics for a survey in an "item/dimension" element of a matrix and a "group" element of a matrix. The groups in the matrix are the groups to which the relevant line of data is a member, unless the hash matrix is a batch matrix including all groups. In an embodiment, the hash matrix is a two-dimensional array of statistics objects coupled with three hash table structures. The hash table structures include a structure for items, a structure for groups, and a structure for each dimension or group of items, for example. The hash table structures provide an associative look-up in the hash matrix on the basis of an item/group or dimension/group pair, for example. As a result, look-ups for a particular statistic (for purposes of retrieval or update, for example) are performed in $O(C)$ time. In an embodiment, memory usage is optimized for the smallest memory usage possible while maintaining a statistic state.

In an embodiment, the hash table is a 10×N allocation, where N is the size of the group element or the size of the combined items and dimensions element. In a typical case, collisions in the hash table are infrequent. A higher hash table allocation multiplier may be used to reduce collisions in certain cases.

For example, overall memory utilization within the hash matrix may be 200 bytes×G×(I+D), where G is a group count, I is an item count, and D is a dimension (or group of items) count. If G=10,000 and I+D=1000, total memory utilization to hold a summarization state is slightly over 2 Gigabytes, including space used by the hash tables, for example.

Once summarization is complete, the incremented statistics are written back to the database 120. Control flow is passed back to the summarization coalescer 230. If more messages remain in the message queue, the summarization coalescer 230 may repeat the statistics summarization process. The engine adapter (write) 330 receives results generated by the statistics processor 320. The engine adapter (write) 330 writes the updated statistics to the database 120. Thus, the database 120 is updated with the analyzed survey results and/or the new group.

Statistics for a particular item/group pair may include mean, standard deviation, response frequency for each response option, recode frequency for each recode, actual N, weighted N, and a stored non-response count, for example. Statistics for a particular dimension/group pair include mean, standard deviation, response frequency for each response option, recode frequency for each recode, actual N, weighted N, and a stored non-response count, for example.

Statistics may be calculated for each question in a survey. Additionally, statistics or scores may be calculated for dimensions or themes in a survey. In an embodiment, calculations are done prior to suppressing data due to an insufficient number of respondents. Additionally, responses outside a valid range of answers are ignored. In an embodiment, rounding occurs when data is retrieved not when statistics are calculated. In an embodiment, a blank record in the database 120 is counted toward a total number of responses but not for a question-level response calculation. Reverse score settings may also be used in calculations (a response with valid values ranging from 1 to 5 may be recoded as: 1=5, 2=4, 3=3, 4=2, and 5=1, for example).

Suppression of responses may be used to ensure that each group has at least N responses to a question or a dimension. Alternatively, results may be suppressed based on responses of other groups. Relationships between groups and suppression rules may be configured. A group may be assigned a minimum number or level of responses for a particular question or group of questions, for example.

In an aggregate method for determining statistics, theme or dimension results are created from question level results. Response frequencies are summed from questions comprising the dimension of interest. Calculations are similar to survey question response calculations, but the number of respondents is averaged for a dimension or theme score. First, response categories or buckets (for example, favorable, neither, unfavorable, good, poor, fair, yes, no, etc.) are added from the questions that are used to compute the dimension.

Then, for a percentage statistic, response frequency bucket counts from the dimension are divided by a total of counts across all frequency buckets. Each response bucket may be assigned a value for mean and standard deviation calculations, for example. For mean or average scores, dimension frequency bucket values are multiplied by dimension frequency bucket counts. The total is then divided by a total number of respondents. For example, Mean=((Frequency Bucket 1×1)+(Frequency Bucket 2×2)+(Frequency Bucket 3×3))/Total Number of Respondents. A number of users responding to a dimension may be calculated as an average of a number responding across the questions used to calculate the dimension. The numbers of respondents for each question are added, and then the total is divided by the total number of questions used to calculate the dimension. In an embodiment, questions with zero respondents are included in the dimension number responding calculation. A count of non-responses may also be calculated by summing non-response frequency buckets.

In an embodiment, survey question statistics follow rules defined under an aggregate method. Alternatively, other statistical methods may be used to process survey data. In an embodiment, question results are produced for a group if the question is included in a data file layout definition for the group.

In a "by case" method for determining statistics, dimension results are created for each respondent who answered at least one question within the dimension. Respondent dimension scores are averaged. First, question results are processed for each respondent. Then, a dimension score is created for each respondent by summing item responses and dividing by the number of questions answered within the dimension. A mean/average dimension score may be calculated from the summed item buckets using the following formula, for example: Mean=((Frequency Bucket 1×1)+(Frequency Bucket 2×2)+ (Frequency Bucket 3×3))/Total Number of Responses Across Items. Calculations may be finalized by averaging the respondent dimension scores.

A "by item" method uses the aggregate method, described above, to calculate item results. Item results may then be averaged to create dimension scores. In an embodiment, items that do not meet a minimum N requirement are ignored. Additionally, dimension calculations may be based on rounded item results.

Master themes or dimensions may also be calculated. Master dimensions are built from sub-dimensions rather than from items. Sub-dimensions may be calculated based on question results. Sub-dimension results may be used to calculate master dimension results using the "by case" or "by item" calculation method, for example.

Mean and standard deviation may be recalculated when a respondent is added to a group. The following equations may be used to calculate mean and standard deviation:

$$DX = (X - S1)/N \quad (1);$$

$$DX2 = DX^2 \quad (2);$$

$$S2 = S2 + (N \times (N-1) \times DX2) \quad (3);$$

$$S1 = S1 + DX \quad (4);$$

$$SD = SQR(S2/(N-1)) \quad (5),$$

where X is a respondent's answer, N is a number of respondents, S1 represents a mean, S2 indicates a sum of squares, SD is a standard deviation, and SQR is a square root. Thus, a previous mean value may be used with a respondent's answer and a number of respondents to calculate a new mean value. Similarly, a previous sum of squares may be used with a respondent's answer and a number of respondents to determine an updated standard deviation.

In an embodiment, results may be weighted by respondent to reflect population characteristics. If a weight value is present in a data table for a respondent, the respondent's result is weighted by the weight value. To weight data, the weight value is added to the data rather than incrementing a response bucket by one. A statistic representing a number of respondents is typically not weighted but represents the true number of people responding to a question.

The statistical summarization engines 240-243 may include a plurality of routines for statistics and data. For example, an engine 240-243 may include a "get data" routine to return a requested statistic. In an embodiment, the get data routine accommodates both suppression and rounding results. In an embodiment, the get data routine takes several parameters, including an identifier for a requested group, an identifier for a requested question or dimension, a request type (question or dimension, for example), a desired statistic, a desired suppression, and a rounding format (number of decimal points, for example). Additional parameters may be used to specify conditions for suppression, for example. The desired statistic may be a frequency bucket (a number responding for a specific bucket requested), a percentage bucket (a percentage responding for a specific bucket requested), a non-response bucket (a number of non-responses for a bucket or buckets), a mean or average score, a standard deviation, a number of valid responses for a requested question or dimension (Actual N), and/or a total number of respondents for a group regardless of question or dimension (Total N), for example. A desired suppression may include no suppression, minimum N responses, group suppression, custom suppression, or other suppression routine, for example.

The get data routine may return the desired statistic and an outcome of the data search. The routine may return a success (statistic was found and not suppressed), suppressed (statistic was found but was suppressed due to selected suppression rules), or invalid (statistic was not found and no data was returned), for example.

The statistical summarization engines 240-243 may also include a "get population" routine, for example. In an embodiment, the get population routine counts a number of records matching a group's criteria as population size. Alternatively, all records in a record set may be returned so that information from the records may be printed.

Another routine is a "get written comment" routine. The get written comment routine retrieves written comments from a written comment file for a specified group. Written comments may be returned by question and/or by topic within a question, for example. In addition to actual comments, other statistics may be provided, such as a number of comments from the question for the group, a number of respondents providing comments for the question, a number of comments within a topic for a written comment question, and a percentage of comments within a topic for a written comment question.

In an alternative embodiment, the system 100 may include a reporting system (not pictured). The reporting system may function as a batch processor to definition business rules for parsing and survey statistical analysis, for example. In an embodiment, the reporting system includes a single statistics processor that performs incremental statistical processing, for example. In an embodiment, messages are not multiplexed or coalesced, as in FIGS. 2 and 3. Data and groups are retrieved and summarized in the statistical processor of the reporting system. Statistical results may be displayed, printed, and/or stored in the database 120, for example. The reporting system may be used to define and analyze groups, dimensions items, responses, data fields, and/or report data, for example. The reporting system may update the database 120 for use with the survey analysis system 200.

Figure 7:
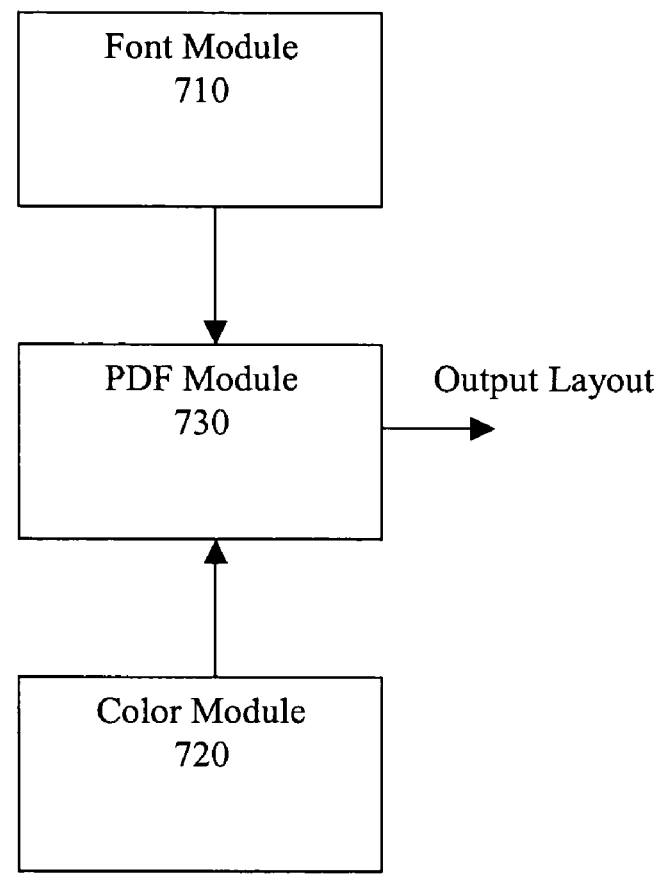
FIG. 7 illustrates a report layout system for generating documents for displaying survey analysis data in accordance with an embodiment of the present invention.

FIG. 7 illustrates a report layout system 700 for generating documents for displaying survey analysis data in accordance with an embodiment of the present invention. In an embodiment, the system 700 simplifies production of report layouts in Adobe® Portable Document File (PDF) format, Microsoft® Word format, or Microsoft® Excel format, for example. In an embodiment, the system 700 includes a font module 710, a color module 720, and a PDF module 730. In an embodiment, the system 700 is used with PDFLib® and PDFGen libraries to generate reports in PDF format, including text and/or graphics. Additionally, applications, such as Excel Write™, may be used to generate Microsoft Excel® documents on the World Wide Web.

The font module 710 facilitates font selection and generation for the report, such as the report PDF file. In an embodiment, the font module 710 is a public application programming interface (API). The font module 710 encapsulates a font used in generation of PDF or other document format files. The font module 710 allows font selection that functions independent of a particular character set. For example, the font module 710 substitutes appropriate fonts if Kanji characters are being printed using a Latin-based font.

To configure the font for the report, the font module 710 may use properties such as Embedded, Encoding, FontName, FontScale, GetLangEnum, IsBold, IsItalic, IsUnderlined, IsUnicode, Language, and Size. The font module may also use methods such as Copy, GetLanguageList, SetFontByName, SetFontCustom, and SetStyle.

The color module 720 may also be implemented as a public API, for example. In an embodiment, the color module 720 simplifies assigning color to objects when generating a document, such as a PDF file. For example, the color module 720 allows creation of a color using RGB triads or "named colors" from a pre-set enumeration. For color generation, the color module 720 may use properties such as color (red, green, and blue, for example) and name. The color module 720 may also use methods such as copy, SetByName, and SetByRGB.

The PDF module 730 includes drawing, measuring, and layout routines used in generation of PDF, Microsoft® Excel, Microsoft® Word, HTML, XML or other document files. For example, the PDF module 730 includes a PrintTextInBox routine that takes a FontPDF object (for text font) created by the font module 710 and a ColorPDF object (for text color) created by the color module 720. The PrintTextInBox routine also uses coordinates for document layout, an alignment enumerator value, and an optional parameter to indicate a number of characters not printed with an attempt to print (useful for knowing how many lines to layout), for example. The PDF module 730 may use output from the font module 710 and color module 720 to generate a report layout for displaying survey and statistical data at the output 140. Survey statistical data may be inserted in the report template generated by the system 700. The completed report may be stored and/or displayed. In an embodiment, the report PDF file is displayed on the Web. In an alternative embodiment, the report file is converted to an Extensible Markup Language (XML) format document for display on the Web.

In order to produce the report document layout, the PDF module 730 may use properties such as Creator, CurrentPage, DocumentStatus, and m_PDF. The PDF module 730 may also use methods such as AddBookMark, AddImage, AddimageInBox, AddWebLinkBox, BeginPage, CloseFile, Copy, CurHGraphPos (current horizontal position of graph cursors, CurHPos (current horizontal position of text cursor), CurPageHeight, CurPageWidth, CurVGraphPos (graph cursor vertical position), CurVPos (text cursor vertical position), DrawShape (bar, line, box, circle, polygon, for example), EndPage, GetActualX/Y, GetMatchingPenColor, HTMLColorToRGB, MoveHPos, MoveVPos, OpenFile, PlacePDI, PrintText, PrintTextInBox, PrintTextInBoxHTML, ScalePage, and SetCursomPageSize.

Therefore, certain embodiments of the present invention present a real-time, electronic survey processing system. Certain embodiments allow a user to create surveys and collect data. Questions, groups, and dimensions (themes), for example, may be defined. An engine may process the data. Then a report is generated from the processed data.

Figure 8:
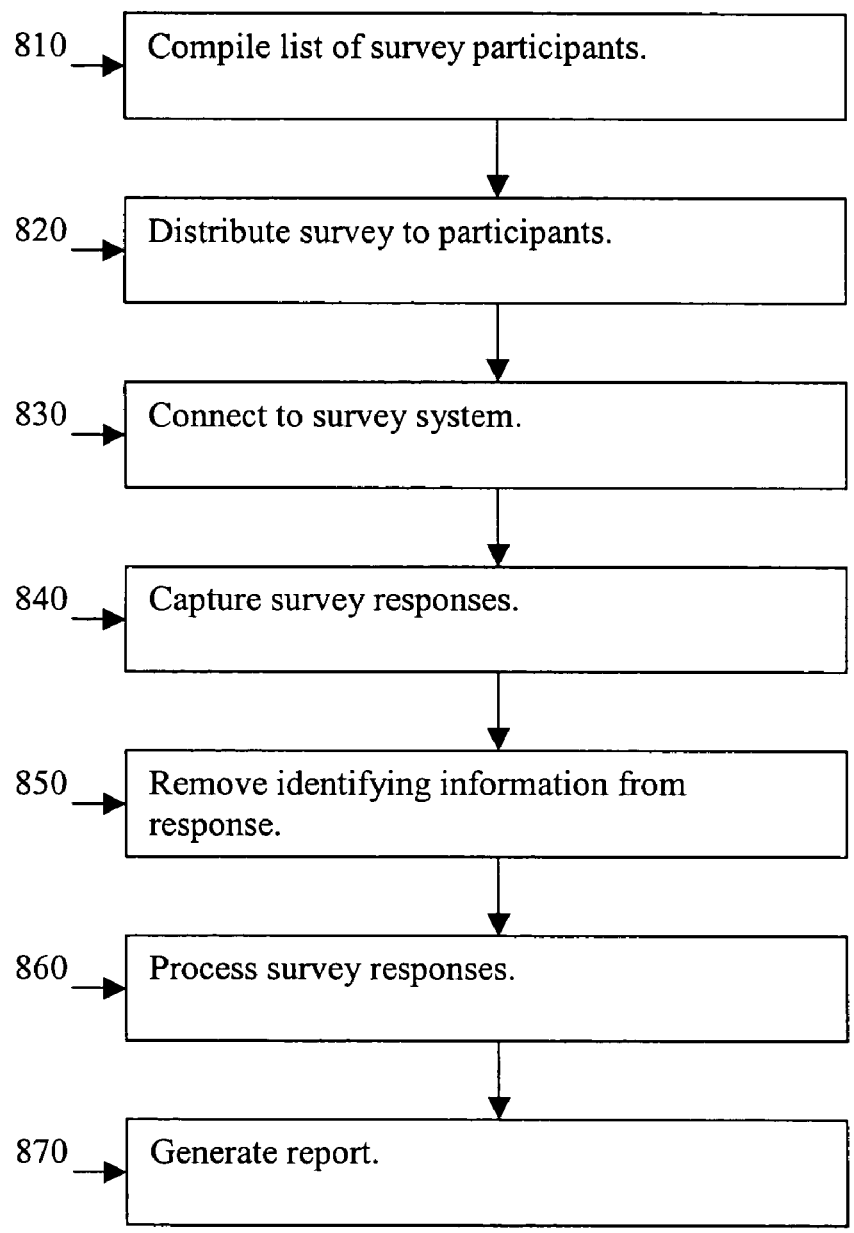
FIG. 8 illustrates a flow diagram for a method for electronic survey administration and analysis used in accordance with an embodiment of the present invention.

FIG. 8 illustrates a flow diagram 800 for a method for electronic survey administration and analysis used in accordance with an embodiment of the present invention. First, at step 810, a list of survey participants is compiled. For example, an email list may be compiled for use in administering the survey. Then, at step 820, a survey is distributed to survey participants on the list. For example, a survey is emailed to each of the participants on the email list with a link to the survey Web page and a password.

Next, at step 830, survey participants connect to a survey administration system and complete the survey. For example, the survey participants access a Web page to take the survey. The identity of the participant may be authenticated. Then, at step 840, the responses of the participants are captured. For example, a Web-based form captures the participants' responses.

At step 850, identification and password information, except for a respondent identifier, is stripped from the survey data. Then, at step 860, the survey data is sent to a processing and reporting system. In an alternative embodiment, paper surveys may be entered into a datafile for processing. Finally, at step 870, a report of statistical survey data may be generated.

Survey and report displays may be translated for different languages. In an embodiment, a translation of survey questions may be submitted when the survey is created, and the responses and resulting output are translated accordingly.

In an embodiment, an administrator may select different rules for processing survey data. The administration may set different response values, response scales, and/or reference items for surveys. Types and styles of statistical reports may be selected and fed to the reporting system 700. Groups may be defined based on a certain set of values for selected questions. Groups may also be selected using a syntactical interpreter. The interpreter may construct a data select statement using statistical operators to define groups of data.

In an alternative embodiment, a sampling tool may be used to sample survey data and statistics. The sampling tool may perform statistical calculations on the survey data. The sampling tool may perform random statistical calculations and stratified statistical calculations (data divided into subgroups, for example) using the survey response data.

Thus, certain embodiments of the present invention provide a system and method for analyzing survey and statistical data. Certain embodiments use distributed computing techniques to perform statistical calculations for data such as general purpose and multi-rater feedback data. Certain embodiments provide a scalable system that may add and subtract hardware to accommodate survey load without affecting software or functionality. Certain embodiments include a matrix structure coupled with hash tables for efficient processing of survey statistics across an entire survey. In certain embodiments, a criteria parser based on externally definable lexical rules may be used to determine, for example, which survey responses belong to which groups. In an embodiment, a user may define criteria statements and retrieve results in real time. Certain embodiments multiplex survey summarization requests among multiple summarization servers to allow for peak performance across a plurality of surveys. Multiple surveys and/or multiple databases may be accommodated. Thus, certain embodiments provide processing of survey data in real time and allow for immediate feedback during the survey process.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A real-time survey analysis system, said system comprising:
   a runtime engine for receiving survey data;
   at least one summarization coalescer for sorting survey data and routing said survey data to at least one statistical summarization engine, said at least one summarization coalescer sorting and routing said survey data based on at least one criterion; and
   at least one statistical summarization engine for analyzing said survey data in real time to perform at least one of summarization and statistical analysis,
   wherein said summarization coalescer compares a plurality of survey data with a history list of recently processed surveys to route said plurality of survey data to said at least one statistical summarization engine.

2. The system of claim 1, wherein said at least one summarization coalescer receives a stream of survey data from a plurality of sources.

3. The system of claim 1, wherein said survey data comprises at least one of survey completion data and new survey reporting group data.

4. The system of claim 1, wherein said at least one criterion further comprises at least one criterion to allow said summarization coalescer to group incoming survey data in an optimal order for processing.

5. The system of claim 1, further comprising a reporting engine for generating a new group for survey reporting.

6. The system of claim 1, further comprising a database for storing at least one of survey data and survey reporting group definitions.

7. The system of claim 1, further comprising a user interface for engine ring survey data.

8. The system of claim 7, wherein said user interface further comprises a Web-based user interface.

9. A real-time survey analysis system, said system comprising:
   a runtime engine for receiving survey data;
   at least one summarization coalescer for sorting survey data and routing said survey data to at least one statistical summarization engine, said at least one summarization coalescer sorting and routing said survey data based on at least one criterion; and
   at least one statistical summarization engine for analyzing said survey data in real time to perform at least one of summarization and statistical analysis,
   wherein said at least one statistical summarization engine reads a previous summarization state from a database to mark a starting point from incremental statistic computation using said survey data.

10. The system of claim 9, wherein said at least one summarization coalescer receives a stream of survey data from a plurality of sources.

11. The system of claim 9, wherein said survey data comprises at least one of survey completion data and new survey reporting group data.

12. The system of claim 9, wherein said at least one criterion further comprises at least one criterion to allow said summarization coalescer to group incoming survey data in an optimal order for processing.

13. The system of claim 9, further comprising a reporting engine for generating a new group for survey reporting.

14. The system of claim 9, further comprising a database for storing at least one of survey data and survey reporting group definitions.

15. The system of claim 9, further comprising a user interface for entering survey data.

16. The system of claim 15, wherein said user interface further comprises a Web-based user interface.

17. A method for real-time processing of survey data, said method comprising:
   receiving, at a runtime engine, survey data;
   sorting, by at least one summarization coalescer, the survey data and routing said survey data to at least one statistical summarization engine,
   wherein said sorting and routing of said survey data are based on at least one criterion;
   analyzing, by the at least one statistical summarization engine, said survey data in real time to perform at least one of summarization and statistical analysis,
   wherein said at least one statistical summarization engine read a previous summarization state from a database to mark a starting point from incremental statistic computation using said survey data.

* * * * *